United States Patent [19]

Kawahara

[11] Patent Number: 5,060,093

[45] Date of Patent: Oct. 22, 1991

[54] SYSTEM FOR CONTROLLING DISPLACEMENT OF A HEAD IN A DISC STORAGE UNIT

[75] Inventor: Yuji Kawahara, Kawasaki, Japan

[73] Assignee: Fuji Electric Co., Ltd., Kawasaki, Japan

[21] Appl. No.: 336,346

[22] Filed: Apr. 11, 1989

[30] Foreign Application Priority Data

Apr. 20, 1988 [JP] Japan .................... 63-97336

[51] Int. Cl.$^5$ .................... G11B 21/08; G11B 5/55
[52] U.S. Cl. .................... 360/78.13; 360/78.04; 369/32; 369/33; 318/696
[58] Field of Search ............. 360/78.13, 78.04, 78.06, 360/78.07; 318/685, 696, 561; 369/32, 33, 41

[56] References Cited

U.S. PATENT DOCUMENTS 3,458,786  7/1969  Thompson .................... 360/78.13
4,564,796  1/1986  Yoshino et al. ................ 318/696
4,724,369  2/1988  Hashimoto .................... 318/561

Primary Examiner—Aristotelis M. Psitos
Assistant Examiner—Steven R. Garland
Attorney, Agent, or Firm—Spencer & Frank

[57] ABSTRACT

A system for controlling the displacement of a head to reduce access time in a disc storage unit having a multi-phase stepping motor. While the disc storage unit receives a series of pulses designating the desired displacement of the head, a counter counts the number of pulses received. When the count exceeds a predetermined value at the end of a predetermined time as indicated by a timer, a driving unit selectively drives the stepping motor to displace the head. Displacement of the head towards a desired position may begin before reception of the series of pulses designating the desired position is completed, thereby reducing access time.

8 Claims, 2 Drawing Sheets

SYSTEM FOR CONTROLLING DISPLACEMENT OF A HEAD IN A DISC STORAGE UNIT

BACKGROUND OF THE INVENTION

1. Field of the Invention

The present invention relates to a system for controlling head movement in a disc storage unit in which a multiphase stepping motor is used for displacing a head and in which in response to the reception of a series of pulses for designating the number of stepping displacements, the head is controlled to be displaced in accordance with the designated number of stepping displacements.

2. Description of the Prior Art

When accessing a disc, typically a fixed disc, a seeking operation is carried out to displace the head onto a track along which the desired data is recorded by selecting the track out of hundreds of tracks defined over one or both surfaces of the disc. As the means for moving the head, stepping motors have been widely used. As the name implies, the stepping motor displaces the head stepwise. The stepping motor has a plurality of exciting phases (generally, two exciting phases). The principle of operation of the stepping motor is similar to conventional motors in general. The clockwise or counterclockwise of a rotor of the motor is performed by switching vectors which are defined by a plurality of phase currents (exciting currents) flowing through coils of the motor corresponding to a plurality of exciting phases. In the access operation, the computer designates a logic address of desired data which in turn is converted into a physical address including the track number of the track along which the desired data is recorded, so that a difference in number between the track number a desired track upon which the head is to be positioned and that of a track upon which the head is positioned at present is computed. Both of a direction signal, which represents a sign of the difference, and a series of step pulses, which include pulses, the number of which is equal to the numerical value of the difference, are supplied to the disc storage unit.

In the disc storage unit, after receiving the series of step pulses, the vectors are sequentially switched in accordance with the switching times designated by step pulses and in the direction designated by the direction signal, with sequentially switching the phase currents by the signal D, so that the stepping motor is driven to displace the head stepwise in the designated direction.

If, however, the pulse rate of the series of step pulses is considerably low (for instance 10 milliseconds per pulse), it takes as long as five microsecond to receive the pulses which designate the number of steps, in the case of recently developed disc storage units in which more than 500 tracks are defined over one surface of the disc. Accordingly, it is difficult to shorten the access time.

SUMMARY OF THE INVENTION

In view of the above, it is an object of the present invention to provide a head displacement control system which can substantially solve the above and other problems encountered in the conventional control systems and which can reduce the access time in a disc storage unit in which the amount of head displacement is represented by a series of step pulses.

In one aspect, the present invention provides an apparatus for controlling displacement of a head in a disc storage unit and polarity designation signals Pa, Pb which unit includes a disc with a surface on which a plurality of tracks for recording data are defined, the head for writing and reading data onto and out of the plurality of tracks, and a stepping motor for displacing the head on the surface of the disc, and wherein a series of pulses are received, the number of which designates a difference between a present position of the head and a desired position of the head relative to the plurality of tracks, so that the desired position of the head is designated, the apparatus comprising:

a timer for measuring a predetermined time, said predetermined time being less than the time for receiving a maximum number of pulses of the series of pulses;

count mans for counting pulses received during the predetermined time being measured by the timer; and drive means for selectively driving the stepping motor when a counted value counted by the count means is greater than a predetermined value.

In another aspect, the present invention provides a method for controlling displacement of a head in a disc storage unit, which unit includes a disc with a surface on which a plurality of tracks for recording data are defined, the head for writing and reading data onto and out of the plurality of tracks, and a stepping motor for displacing the head on the surface of the disc, and wherein a series of pulses are received, the number of which designates a difference between a present position of the head and a desired position of the head relative tot he plurality of tracks, so that the desired position of the had is designated, the method comprising:

a first step of counting pulses which are received during a predetermined time, said predetermined time being less than the time for receiving a maximum number of pulses of the series of pulses;

a second step of comparing a counted value counted in the first step with a predetermined value;

a third step of driving the stepping motor in such a way that one of a plurality of vectors defined by phase currents flowing through coils of the stepping motor is switched to a predetermined vector of the plurality of vectors when the counted value is greater than the predetermined value;

a fourth step of counting pulses which are received during the predetermined time either when the counted value is less than the predetermined value or after the third step;

a fifth step of judging whether or not the series of pulses end by comparing the counted value obtained in the first step with a counted value obtained int he fourth step; and a sixth step of carrying out a seek operation to displace the head to the desired position when the judgment in the fifth step is that the series of pulses end.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Now the present invention will be described in detail with reference to the accompanying drawings.

Figure 1:
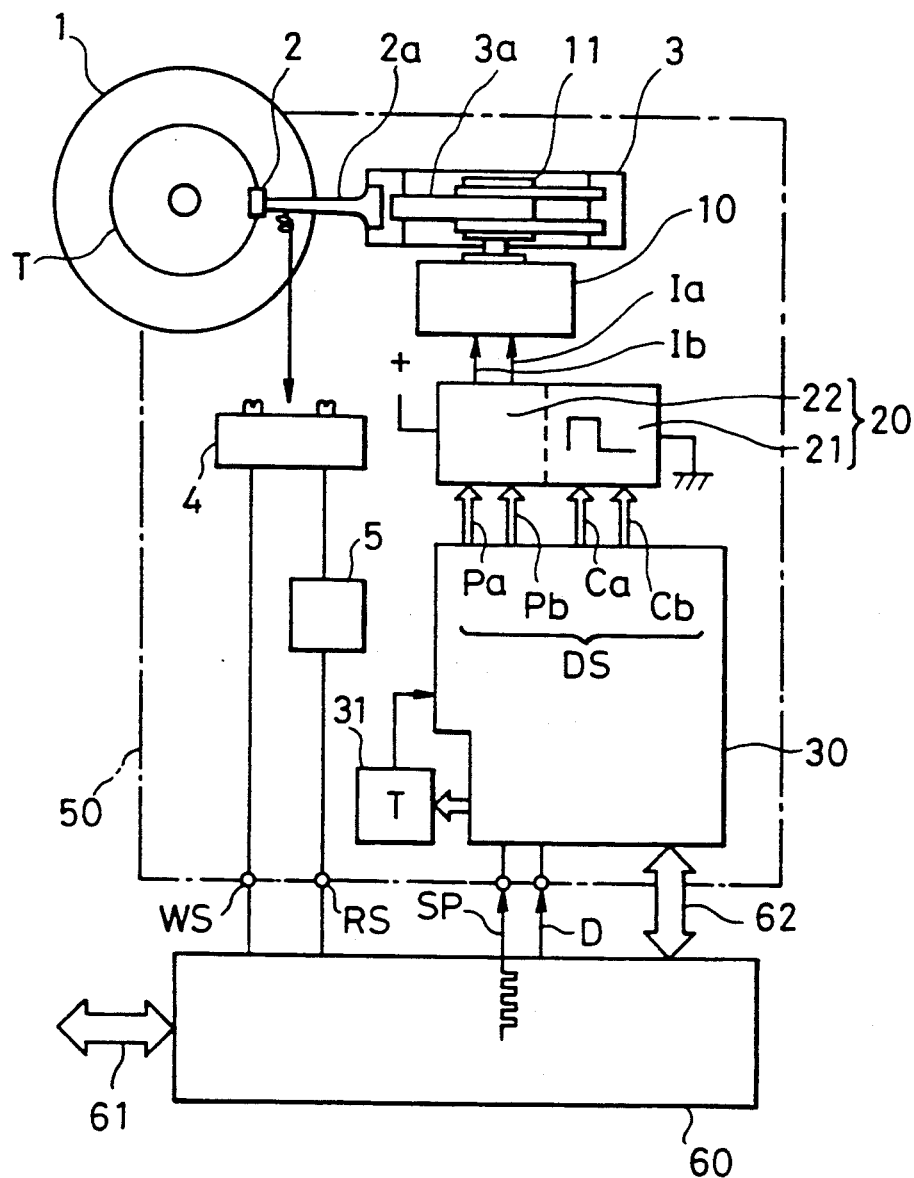
FIG. 1 is a block diagram of a disc storage unit with associated controller to which is provided a head displacement control system in accordance with the present invention.

FIG. 1 shows an embodiment of the present invention. A head 2 for writing and reading the data onto and out of each of a plurality of tracks T defined over a surface of a disc 1 of a disc storage unit 50, is supported through an arm 2a of the head 2 by a carriage 3 which can move in the right or left direction in FIG. 1. The carriage 3 is mechanically securely attached to a stepping motor 10 through its capstan 11 and a thin metal band 3a wound therearound. The head 2 is connected to a read/write circuit 4 in a conventional manner and the readout signal RS from the read-write circuit 4 is supplied through a demodulation circuit 5 to a controller 60. On the other hand, the write signal WS is directly supplied to the read-write circuit 4 from the controller 60.

Figure 3:
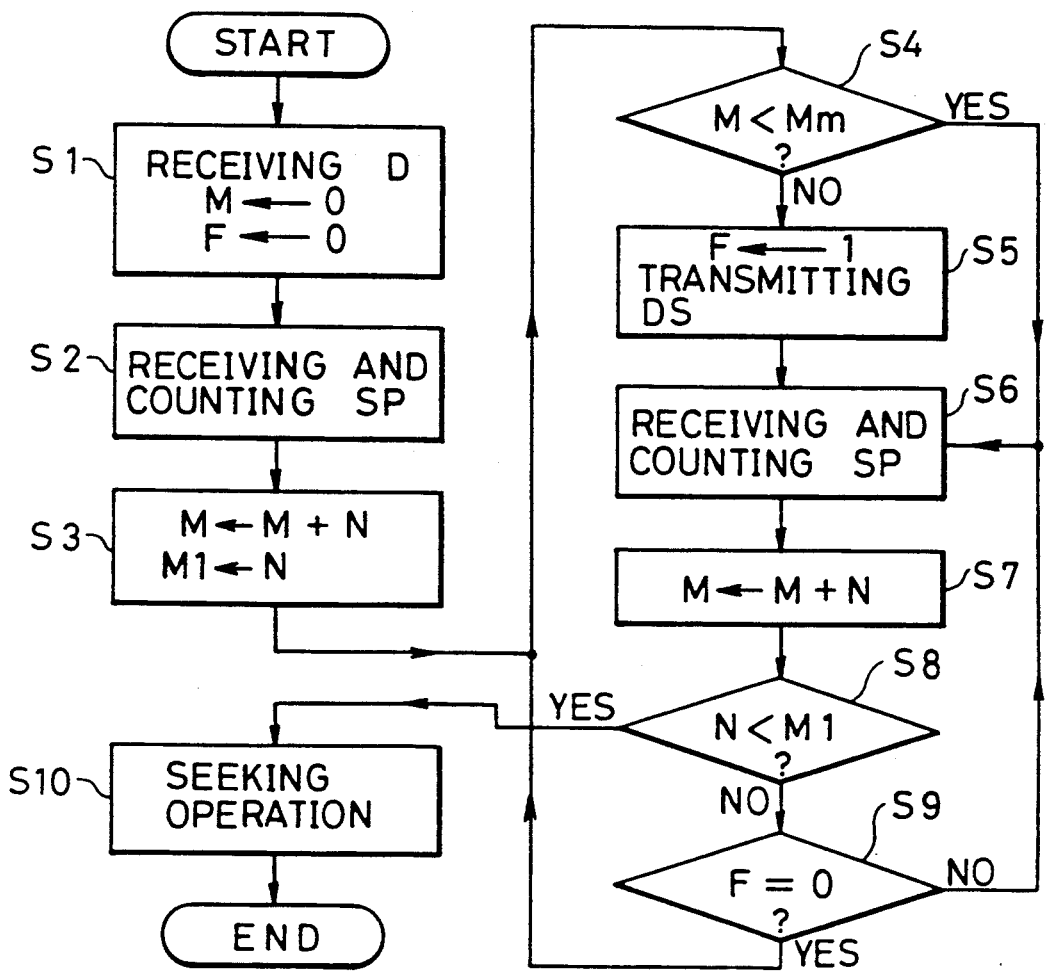

In order to supply two phase currents Ia and Ib to the two-phase stepping motor 10, there is provided a driver circuit 20 which includes a phase current value generating unit 21 and a phase current polarity switching unit 22 as shown in FIG. 1. The driver circuit 20 receives the current value designation signals Ca, Cb and polarity designation signals Pa, Pb from a microprocessor 30. The phase current value generating unit 21 can be a PWM circuit while the polarity switching unit 22 can be a switching circuit. The microprocessor 30 to which the controller 60 is connected through a bus 62 and with which a timer 31 for generating a time T which can be presettable is associated, controls the disc storage unit 50. The microprocessor 30 always stores data of the present position of the head 2 and that of the vector defined by the phase currents 1a and 1b corresponding to the present position of the head 2. In addition, the control sequence shown in FIG. 3 is also stored in the microprocessor 30.

Figure 2:
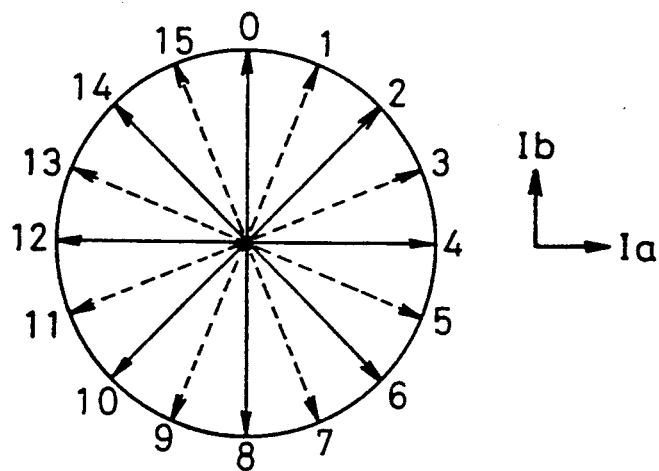
FIG. 2 shows a phase current vector diagram of a stepping motor for displacing a head; an FIG. 3 is a flowchart showing an example of the control procedures executed by a microprocessor 30 shown in FIG. 1.

As shown in FIG. 2, the vectors defined by the phase currents 1a and 1b flowing through coils of the stepping motor 10 include vectors corresponding to the "on-track" state of the head 2, and intermediate vectors. The vectors as shown in FIG. 2 include 16 vectors numbered "0"–"15", and the odd-numbered vectors indicated by dotted lines respectively correspond to the "on-track" states. In general, in the case of driving the stepping motor, these vectors are sequentially switched in the clockwise or counterclockwise direction, but according to the present invention, the predetermined number of vectors are previously selected out of these vectors, and in the case of the displacement of the head 2, only the selected vectors are sequentially switched to drive the stepping motor so that the access time is reduced.

Vectors which are suitable as the selected vectors are those at the positions 2, 6, 10 and 14 indicated by the broad solid arrows in FIG. 2. It is now apparent that in the case where such vectors are selected, the number of switching times can be reduced to ¼, and, it is confirmed experimentally that since amounts of electricity of the phase currents 1a and 1b are equal switching times can be reduced while maintaining a smoothness of the stepping motor movement. The vector defined by the phase currents at which the stepping motor starts being driven can be one other than the selected vector. In the case where from such a state, the stepping motor starts being driven in such a way that the selected vectors are sequentially switched, first, the vector other than the selected vector is switched to the selected vectors. At this time, vibration of the head occurs because of the vector other than the selected vector being defined by the phase currents whose electrical levels are different from each other. If the stepping motor starts being driven before the vibration has been damped, it takes as long as a few milliseconds until the vibration is damped after the head displaced onto a desired track. According to the present invention, therefore, while the series of step pulses SP is being received, the vector other than the selected vector is switched to one of the selected vectors, and after the vibration of the head 2 which is caused by the above-mentioned switching has been damped the switching of the selected vectors is started. In this case, if, however, the designated number of stepping displacements is small, it may happen that the access time by the above-described system is increased adversely. Accordingly, the operation of switching vectors to one of the selected vectors is performed only when the number of the received step pulses exceeds a predetermined number.

As is clear from the above description, according to the present invention, during the operation of displacing the head, the vectors defined by the phase currents of the stepping motor are switched so as to select only one of the selected vectors, thereby the access time can be reduced, and furthermore, by utilizing a time interval for receiving a series of step pulses, the negative effects on the reducing of access time can be reduced, thereby the present invention can substantially solve the above and other problems.

FIG. 3 shows an example of control procedures performed by the microprocessor 30. As the disc storage unit 50 is used in various types of controllers 60, the pulse rate of a series of step pulses varies. Such variation in the pulse rate is compensated for by means of the timer 31 associated with the microprocessor 30.

When the disc storage unit 50 receives a new access command from the controller 60, in Step S1, the direction signal D is read out, and then a variable M for counting the number of the step pulses is reset to "0" while the control flag F is set to "0". In Step S2, during a time interval T set in the timer 31, for instance, until 300 microseconds have elapsed, the step pulses SP counted. Of course, the counted value N of step pulses which is counted up during a predetermined time interval T varies with the pulse rate of a series of step pulses which are supplied from the controller 60 to the disc storage unit 50. In Step S3, the counted value N obtained in Step S2 is added to the counting variable M and the counted value N is substituted into the initial counting variable M1.

In order to determine operation of switching the vector to the selected vectors prior to the operation for displacing the head, in Step S4, whether the count variable M is less than a predetermined minimum designated number Mm is judged. When the result of the judgment is that the designated number of stepping displacement of the head, that is, the value of the count variable M, is less than the minimum number Mm, the control procedure shifts to Step S6, but when the value of the variable M is not less than the minimum number Mm, the control procedure shifts to Step S5, in which the flag F is set to "1", and the driving signal DS is supplied to the driver circuit 20 so that the vector defined by the phase currents supplied to the stepping motor 10 is made coincident with one of the positions of the selected vectors.

The driving signal DS consists of the current value designation signals Ca, Cb and the polarity designation signals Pa, Pb. As is clear from FIG. 2, the current designation signals Ca, Cb may be the same at any of the positions of selected vector 2, 6, 8 and 10, but the polarity designation signals Pa, Pb must designate a polarity corresponding to each of the selected vectors. For instance, it is most rational to designate the position of the selected vector closest to the vector corresponding to the present position of the head 2, because the vibration of the head caused after the switching of the vectors can be reduced to a minimum. The microprocessor 30 always stores data of the vector corresponding the present position of the head 2 and, for instance when the vector designated by the stored data is that of the position 1 or 3 in FIG. 2, the microprocessor 30 designates the selected vector of the position 2 closest to the position 1 or 3. It is preferable that the polarity designation signals Pa, Pb have two bits so that they can not only designate the positive or negative of a phase current but also designate the value of zero of a phase current. The driving signal DS is latched by a latch of the output port of the microprocessor 30 so that the switching of the phase vector in response to the driving signal DS and maintaining the state of the phase currents may be carried out by the driver circuit 20.

In Step S6, the value N of step pulses being received during a predetermined time interval T is counted up and in Step S7, the value N thus counted is added to the counting variable M. Thereafter, in Step S8, whether the series of step pulses has ended; that is, whether the counted value N of the step pulses counted in Step S7 is smaller than the initial counting variable M1 initially stored in Step S3 is judged. When the result is N<M1; that is the series of step pulses has ended, the control procedure shifts to Step S10, but when the result is N≧M1; that is, when the series of step pulses has not ended yet, the control procedure shifts to Step S9. In Step S9, whether the flag F is "0" is judged and when the result is F="0", the control procedure returns to Step S4, but when the result is F≠"0" the control procedure returns to Step S6.

Even when the flag F is "0" and the counted value of step pulses received in Step S2 is less than the minimum value Mm, but when the accumulated value of step pulses obtained by the addition of the counted value of step pulses in Step S6, that is, the value of the counting variable M, is not less than the minimum value Mm, the control procedure shifts to Step S5, in which the rector corresponding to the present position of the head 2 switched to the selected vector. As is clear from the above-described explanation, even when the pulse rate of the series of step pulses is considerably low, whether the vector defined by the phase currents of the stepping motor is previously placed at the position of selected vector can be correctly judged. However, when the flag F is "1", the counting of the step pulses in Step 56 is continued until the series of pulses ends.

When the series of step pulses ended, the control procedure leaves the repetition loop and shifts to Step S10, in which the seeking operation is carried out. During the seeking operation, the selected vectors are sequentially switched so that the head 2 is displaced at a high speed in the direction indicated by the direction signal D to a desired track.

As is clear from the embodiment described above, when the two-phase stepping motor is used, the selected vector at which the amounts of the phase currents are equal is selected so that the head can be smoothly displaced and the access time can be reduced. Furthermore, when the counting of the step pulses is executed a plurality of times, each in a suitable unit time interval, as a result, even if the pulse rate of the series of step pulses is varied over a wide range, it is judged accurately whether or not the vector defined by the phase current of the stepping motor is switched to the selected vector prior to the seeking operation.

It is to be understood that the present invention is not limited to the embodiment described above and that various modifications can be made within the true spirit of the present invention so that each modification can attain its unique effect.

According to the present invention, the means for displacing the head is the multiphase stepping motor, and the system for displacing the head of the disc storage unit to which the series of step pulses is supplied in order to designate the number of stepping displacements of the stepping motor is such that, to displace the head, vector corresponding to the present position of the head 2 is the vectors which are selected out of vectors defined by a plurality of phase currents, of the stepping motor are sequentially switched. As a result, the switching times of the vector required to displace the head onto a desired track, can be reduced and the access time of the disc storage unit can be remarkably reduced.

Furthermore, according to the present invention, while the series of step pulses is being received, only the number of the step pulses becomes higher than the predetermined minimum the vector defined by the phase currents of the stepping motor is switched to one of the selected vector. Thereby, while the head is being displaced and after the head is positioned on a desired track, the vibration of the head can be effectively suppressed so that a seeking time required for positioning the head on a desired track can be reduced and therefore the access time can be further reduced.

The features of the present invention are very important when the disc storage unit is connected as a peripheral storage unit for a computer having various operation performance and characteristics. The present invention can therefore improve the performance of the computer and can enhance its application efficiency.

The invention has been described in detail with respect to embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An apparatus for controlling displacement of a head in a disc storage unit, which unit includes a disc with a surface on which a plurality of tracks for recording data are defined, said head for writing and reading data onto and out of said plurality of tracks, and a stepping motor for displacing said head on said surface of said disc, the disc storage unit receiving a series of pulses which represent the number of tracks to displace the head, so that a desired position of said head is designated, said apparatus comprising:

a timer for indicating the elapse of a predetermined time, said predetermined time being less than the time required to receive a maximum number of pulses being representative of the maximum number of tracks the head could be displaced;

count means for counting pulses received during said predetermined time indicated by said timer; and drive means for selectively driving said stepping motor when a counted value counted by said count means during said predetermined time is greater than a predetermined value.

2. An apparatus as claimed in claim 1, wherein said drive means selectively drives said stepping motor by switching to one of a plurality of predetermined vectors of a plurality of vectors defining phase relationships between currents flowing through coils of said stepping motor, and thereafter, a seeking operation is carried out to displace said head to said desired position.

3. An apparatus as claimed to claim 2, wherein said currents comprise two currents, and said plurality of vectors consist of sixteen vectors defining the phase relationships between the two currents, directions of said sixteen vectors having equal angular intervals, a position of said head on each of said plurality of tracks corresponding to every other vector of said sixteen vectors, and said predetermined vectors corresponding to the remaining vectors of said sixteen vectors.

4. A method for controlling displacement of a head in a disc storage unit, which unit includes a disc with a surface on which a plurality of tracks for recording data are defined, said head for writing and reading data onto and out of said plurality of tracks, and a stepping motor for displacing said head on said surface of said disc, the disc storage unit receiving a series of pulses from an external controller, the number of which pulses designates a difference between a present position of said head and a desire position of said head relative to said plurality of tracks, so that a desired position of said head is designated, said method comprising:

a first step of counting pulses which are received during a predetermined time, said predetermined time being less than the time for receiving a maximum number of pulses of said series of pulses, the maximum number of pulses being representative of the maximum number of tracks the head could be displaced;

a second step of comparing a counted value counted in said first step with a predetermined value at the end of said predetermined time;

a third step of driving said stepping motor by switching to one of a plurality of predetermined vectors of a plurality of vectors defining phase relationships between currents flowing through coils of said stepping motor when said counted value is greater than said predetermined value;

a fourth step of continuing the count pulses which are received during said predetermined time when said counted value is less than said predetermined value or continuing to count pulses which are received after said third step;

a fifth step of judging whether or not said series of pulses has ended by comparing said counted value obtained in said first step with a counted value obtained in said fourth step; and a sixth step of carrying out a seeking operation to displace said head to said desired position when the judgment in aid fifth step is that said series of pulses has ended.

5. In a disc storage unit which includes a multi-phase stepping motor for displacing a head over tracks defined on a disc and which receives signals from an external controller, a control system comprising:

timing means for indicating the elapse of a predetermined time;

motor driving means for selectively driving the stepping motor; and processing means for processing signals from the eternal controller and said timing means to produce output signals to said driving means, said processing means:

counting a series of pulses from the external controller representing the desired number of tracks to displace the head;

comparing the counted number of pulses with a predetermined value when said timing means indicates the elapse of said predetermined time; and if the comparison indicates the elapse of said predetermined time; and if the comparison indicates that the counted number exceeds the predetermined value, signaling said driving means to selectively drive the stepping motor.

6. The control system of claim 5, wherein said processing means signals said driving means by outputting predetermined polarity designation signals designating one of a plurality of predetermined vectors out of a plurality of possible vectors, and wherein ,in response to receiving the designation signals, said driving means outputs currents to the stepping motor, the phase relationship of the currents being defined by the designated one of the plurality of predetermined vectors.

7. The control system of claim 6, wherein said driving means outputs two currents to the stepping motor based on sixteen possible vectors spaced apart at equal angular intervals and defining sixteen current phase relationships, said predetermined vectors being every other one of the sixteen possible vectors and specifying between track head positions.

8. A method of controlling the positioning of a head on a disc having tacks in a disc storage unit, comprising the steps of:

receiving a series of pulses from an external controller representing the number of tracks to displace the head to a desired position;

counting the number of pulses being received;

at the end of a predetermined time, comparing the number of pulses counted during the predetermined time with a predetermined value;

when the number of pulses counted at the end of the predetermined time exceeds the predetermined value, driving the head to a predetermined position and continuing to count pulses being received;

when the number of pulses counted does not exceed the predetermined value at the end of the predetermined time, determining if the series of pulses has ended, and if the series of pulses has not ended, continuing to count pulses being received; and if the series of pulses has ended, performing a seek operation to drive the head to the desired position.

* * * * *